Patented Apr. 16, 1957

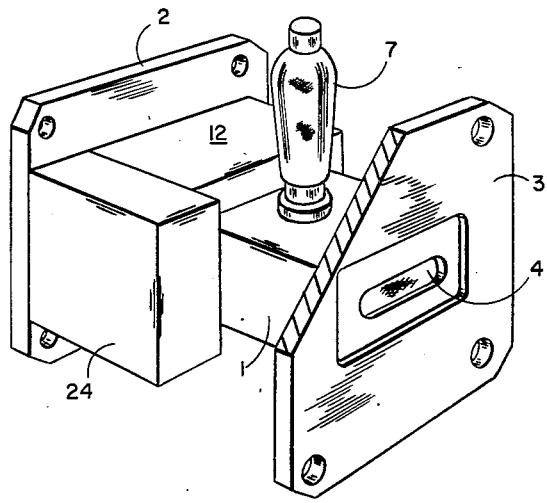
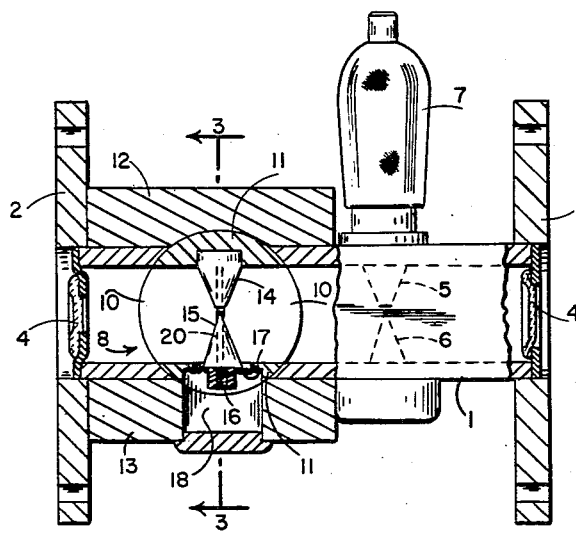
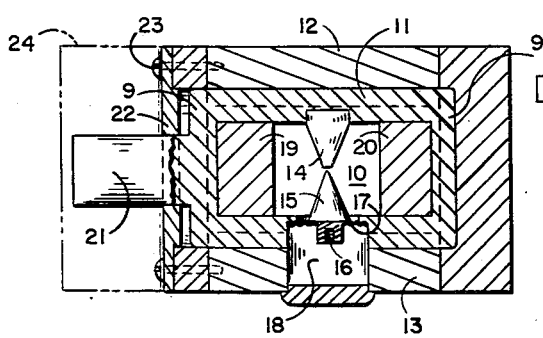

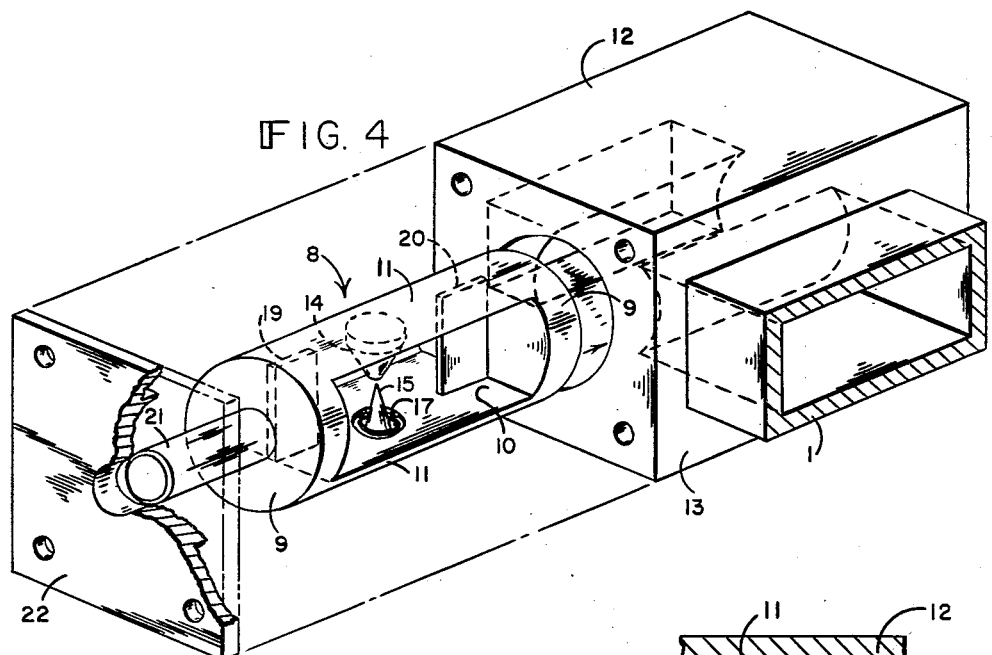
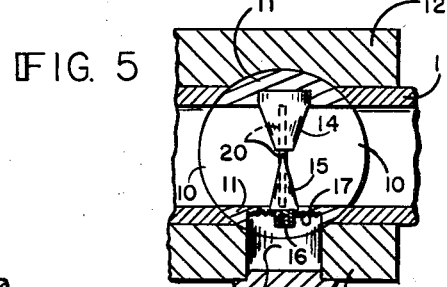
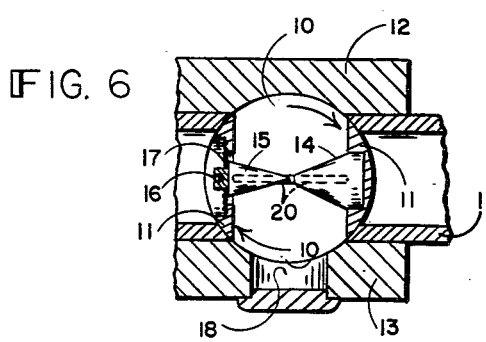

2,789,272

ROTATABLE SHUTTER AND TRANSMIT-RECEIVE DEVICE

Herbert C. Alexander, Peabody, and John E. Burr, Jr., Wenham, Mass., assignors to Bomac Laboratories Inc., Beverly, Mass., a corporation of Massachusetts Application January 4, 1956, Serial No. 557,412

2 Claims. (Cl. 333—13)

The present invention relates to gaseous discharge devices and more particularly to a novel transmit-receive switching tube incorporating a rotary shutter device for use in broadband waveguide systems.

Prior art broadband transmit-receive tubes generally comprise a section of rectangular waveguide having resonant dielectric window members enclosing the ends to define a vacuum-tight envelope to retain a gaseous atmosphere under reduced pressure. Resonant discharge gap structure together with an ignitor electrode is spaced at predetermined intervals within the envelope to provide the necessary voltage gradient to produce a gaseous discharge when the transmitter is operating. In the ionized state, signal energy will be unable to pass through the device. Low power returning signals however, will be permitted to traverse the device without initiating a gaseous discharge and may be carried to the sensitive receiver.

In patent application of Harold Heins, Serial No. 407,707, dated February 2, 1954, now Patent No. 2,734,171, issued February 7, 1956, a novel electromechanical shutter device is disclosed to protect the radar system from any spurious high power radio signals received when the system is inoperative and the ignitor electrode, of the transmit-receive device is not on. In the illustrative embodiment therein, an attenuating element is provided which short circuits the resonant discharge gap and thereby prevents any passage of energy.

It may be desirable in certain applications, particularly high power radar systems to provide means for closing the complete waveguide opening during the period when the system is not operating. Many such shutter devices may be found in the art of the vane type, however additional mounting structures with attendant increase in insertion loss and reduction in overall efficiency is required.

It is an object of the present invention to provide a combination waveguide shutter and transmit-receive device in a unitary structure.

It is a further object to provide a waveguide shutter device within a transmit-receive device which permits complete closing of the waveguide opening by simple mechanical movement.

It is a still further object to provide within the waveguide shutter resonant circuit components with the required capacitance and inductance to enable the unitary structure to function as a transmit-receive device when the shutter is in open position.

Another object is to provide in combination with a transmit-receive tube a hermetically sealed waveguide shutter device with resonant circuit elements which may be rotated to a closed position blocking any transmission of spurious radio signals and an open position permitting normal transmit-receive operation.

A feature of the invention resides in a rotatable cylinder having a rectangular passage perpendicular to the axis of the cylinder with the dimensions of said opening equal to the inside dimensions of the wave-guide structure in which it is mounted. Resonant circuit elements such as iris plates and conical electrodes are positioned with the shutter passage. In the closed position the solid arcuate portions of the cylinder extend completely across the waveguide envelope. By rotating the cylinder 90° by conventional mechanisms, the combination is a transmit receive device having multiple resonant elements to facilitate a gaseous discharge of the enclosed atmosphere or passage of low level received radio signals.

Numerous other objects, features and advantages will be evident after consideration of the following detailed description of an illustrative embodiment and reference to the accompanying drawings in which:

Fig. 1 is a perspective view;

Fig. 2 is a cross-sectional view taken along the longitudinal axis of the device;

Fig. 3 is cross-sectional view taken along the line 3—3 in Fig. 2;

Fig. 4 is partially exploded view with the rotatable component in perspective;

Fig. 5 is a detailed cross-sectional view of the rotatable component in the open position; and Fig. 6 is detailed cross-sectional view with the rotatable component in closed position rotated 90° from the position shown in Fig. 5.

Referring now to the drawings Figs. 1, 2 and 3 there is shown a broadband device capable of transmission of microwave energy from approximately 8500–9500 megacycles. A section of rectangular waveguide 1 is provided with an input flange 2 and output flange 3 hermetically sealed at the ends thereof. Centrally positioned dielectric resonant window members 4 enclose the open ends of the waveguide passage and provide a vacuum tight envelope commonly found in prior art T–R devices. A gaseous atmosphere under reduced pressure of an inert gas such as nitrogen or argon with a small percentage of water vapor added is introduced into the envelope after exhausting.

Spaced at an interval of approximately one quarter of a wavelength is the well-known resonant circuit elements comprising conical electrodes 5 and 6 defining a discharge gap and transverse plates (not shown) to provide the necessary capacitive and inductive elements. An ignitor electrode 7 extends into conical electrode 5 to provide the small degree of direct-current ionization to facilitate the main gaseous discharge.

Our invention resides in the introduction of a rotatable member 8 spaced one quarter of a wavelength from the permanent resonant elements 5 and 6 and a similar distance from input flange 2. A solid metallic cylinder 9 is provided with a rectangular opening 10 cut therethrough perpendicular to the axis of the cylinder. The opening 10 is approximately equal to the inside wall dimensions of waveguide section 1, so that in the open position there will be no appreciable discontinuity presented to microwaves transmitted through the waveguide 1. With the opening 10 cut in cylinder 9, two arcuate sections 11 are thus defined.

In the illustrative embodiment, the diameter of the rotatable member 8 exceeds the dimension of the waveguide 1 and to provide vacuum tight means for mounting this member a metallic block 12 is brazed or soldered to the waveguide envelope 1 with the lower wall portion indicated at 13. The mechanical tolerances of the curved portion of block 12 and cylinder 9 should provide a good friction fit. If desired the inner curved walls of block 12 maybe spaced from the cylinder 9 to provide a choke in the manner well-known in the art.

Rotatable member 9 is provided with the necessary resonant circuit components including a conical electrode 14 extending from arcuate wall 11 and an opposed electrode 15 which is adjustable to set the discharge gap dimensions during fabrication by means of tuning stud 16 and diaphragm 17. An opening 18 in the lower wall 13 of block 12 and corresponding section of arcuate section 11 provides means for introduction of tools to make this adjustment. Metallic inductive iris plates 19 and 20 extend between arcuate sections 11 to complete the resonant circuit.

To retain the rotatable member 8 within envelope 1, a shaft 21 is provided on cylinder 9. Cover plate 22 is then attached to block 12 by means of screws 23 and shaft 21 is exposed for cooperation with means for imparting the rotary motion. Any suitable mechanism such as a motor or solenoid may be employed with suitable gearing to transfer linear into rotary motion to thereby rotate member 8. Such mechanism is enclosed within housing 24 which may be hermetically sealed to cover plate 22 with all joints being brazed or soldered to retain the vacuum-tight condition of the device. No specific mechanism has been illustrated since it will be evident to the skilled artisan that numerous arrangements may be utilized.

The method of assembling our rotatable shutter device is shown in detail in Fig. 4 and the relationship of the components will be observed therein.

Fig. 5 is illustrative of the operation of the embodiment and shows the open position of the rotatable member with the openings 10 in register with the waveguide 1 inner wall structure. In this position the resonant elements are positioned transversely to the path of the microwave energy and the tube functions as a conventional transmit-receive (TR) device.

By rotation of the cylindrical member 8 through 90° as shown in Fig. 6 arcuate members 11 will completely block any transmission of microwave signals through the waveguide 1. This solid metallic path will provide the most effective protection and there is thus shown a single unitary structure incorporating many features heretofore unattainable in gaseous discharge devices of the type described. The rotatable cylinder may be provided with any latching arrangement in either the open or closed positions if desired.

While a preferred embodiment has been described herein the invention need not be limited to the details shown but should be considered according to the spirit and scope of the appended claims.

What is claimed is:

1. A transmit-receive gaseous discharge and rotary shutter device for a microwave transmission system comprising a hermetically sealed envelope containing a gaseous atmosphere, plural resonant discharge capacitive electrodes and inductive iris members positioned transversely within said envelope approximately one quarter of a wavelength from one end, a rotatable shutter element positioned transversely within said envelope a quarter of a wavelength from the opposite end, said rotatable element comprising a metallic cylinder having a passageway therethrough perpendicular to the axis of said cylinder, plural capacitive electrodes and inductive iris members positioned transversely to the longitudinal axis of said envelope within said cylinder passageway and means for rotation of said rotatable element mounted on said envelope.

2. A transmit-receive gaseous discharge and rotary shutter device adapted for mounting in a microwave transmission system comprising a hermetically sealed gas-filled envelope including a length of rectangular waveguide having resonant dielectric window members hermetically sealed at the ends thereof, plural opposed resonant discharge gap conical electrodes and metallic partition members mounted transversely within said waveguide at a point approximately one quarter of a wavelength from one end, a metallic cylinder member mounted transversely within said waveguide at a point approximately one quarter of a wavelength from the opposite end thereof, said cylinder having a rectangular opening therethrough perpendicular to the axis of said cylinder with the dimensions of said opening being similar to the inner wall dimensions of said waveguide, plural opposed resonant discharge gap conical electrodes and metallic plates defining an inductive iris mounted transversely within said cylinder opening and means mounted on said waveguide to rotate said cylinder from a position with the cylinder opening in register with the waveguide inner walls to a closed position with the solid cylinder walls extending across said waveguide.

References Cited in the file of this patent

UNITED STATES PATENTS

| | | |
|---|---|---|
| 2,427,100 | Kihn | Sept. 9, 1947 |
| 2,432,093 | Fox | Dec. 9, 1947 |
| 2,442,671 | Tompkins | June 1, 1948 |
| 2,573,713 | Kannenberg | Nov. 6, 1951 |